Dec. 6, 1960 M. DI GIOVANNI 2,963,671
TRANSDUCER
Filed Aug. 3, 1959 3 Sheets-Sheet 1

INVENTOR.
MARIO DIGIOVANNI
BY
ATTORNEYS.

INVENTOR.
MARIO DIGIOVANNI
BY
ATTORNEYS.

Dec. 6, 1960  M. DI GIOVANNI  2,963,671
TRANSDUCER
Filed Aug. 3, 1959  3 Sheets-Sheet 3

INVENTOR.
MARIO DIGIOVANNI
BY
ATTORNEYS

United States Patent Office 2,963,671
Patented Dec. 6, 1960

2,963,671
TRANSDUCER

Mario Di Giovanni, Pacific Palisades, Calif., assignor to Statham Instruments, Inc., Los Angeles, Calif., a corporation of California Filed Aug. 3, 1959, Ser. No. 831,417

10 Claims. (Cl. 338—4)

This application is a continuation-in-part of my copending application, Serial No. 627,375, filed December 10, 1956, which in turn is a continuation-in-part of my application Serial No. 515,111, filed June 13, 1955, now Patent No. 2,840,675.

This invention relates to a transducer or a motion sensing device, and more particularly concerns instruments for measuring forces, movements, fluid pressures, and the like. The invention is particularly directed to a transducer incorporating a wire resistance strain gage of the so-called unbonded type for measurement of rectilinear motion.

Unbonded strain gages are generally composed essentially of a strain sensitive wire connected to two supports which are subject to separation under an applied force. When subjected to tension the wire changes in dimensions, and therefore changes in resistance. Means are provided for measuring the resulting change in resistance which is then translatable into a measurement of the applied force. Such gages have found a wide application in industry.

Usually, the movable members employed in such devices have supports or linkages to which the mountings for the strain wires are attached. Hence, the strain wire does not change in tension directly in response to movement of such movable members, which are generally in the form of diaphragms to which the force to be measured is applied, but rather in response to movement of such intermediary supports and linkages to which the wire mountings are connected. Hence, the change in tension of the strain wire in such instruments is brought about only indirectly in response to movement of the primary movable members or diaphragms. The use of the intermediate linkages and supports in the prior art devices renders such devices relatively complicated in structure, increases their weight and size, and tends toward inaccuracy of response.

In my above copending application and in my Patent No. 2,840,675 is described a device which avoids the shortcomings of the prior art in the above respects. In such device wire supports are mounted on the opposite ends of a flexible beam or on opposite peripheral portions of a diaphragm, which is supported on a flexible member intermediate the ends of said beam or the peripheral portions of said diaphragm, and an unbonded electrical resistance strain wire is mounted on said wire supports. The strain wire is spaced from the beam or diaphragm, and extends in a plane substantially parallel thereto.

Although the device of said copending application and patent is a valuable improvement over the prior art, the device possesses certain disadvantages. All of the supports or pins for the strain wire of my patented device are mounted on the flexible beam or diaphragm, and when the beam or diaphragm is displaced, the wire supports or pins are each deflected in an arc either toward or away from each other, and as a result of such action the pins often undergo a "whipping" action which places a considerable strain on the pins, tending to cause them to snap and break. This takes place particularly where relatively long pins are employed to obtain a relatively large mechanical advantage.

It is an object of this invention to provide a transducer of the type described in my aforementioned patent, but eliminating the above noted disadvantages of such device.

Another object is to design a transducer of the type described in my above patent, wherein the wire supports or pins are mounted in such a manner as to substantially reduce or prevent breakage of the pins.

A still further object is to afford a transducer having greater linearity of response than the transducer of my above patent.

Other objects and advantages will appear hereinafter.

The transducer of the instant invention basically comprises a flexible beam supported intermediate its ends on a flexible support or flexure, and a motion sensing means associated with the outer end of the beam beyond said flexible support. The transducer, e.g., in the form of a pressure gage, dynamometer or accelerometer, comprises a frame, and the flexible support or flexure member is connected to said frame and to said flexible beam at spaced points intermediate the ends of said beam and at an angle thereto, to provide spaced and localized points of bending in said flexure member intermediate the ends of said beam. Means, e.g., in the form of a pressure chamber or rod, are provided for applying a force to said beam to produce a deflection of said beam on said flexure member at points between the flexure member in a direction opposite to the direction of deflection of said beam at points beyond said flexure member.

As the essential feature of the invention, the strain wire of the invention device is mounted parallel to the axis of the flexible beam or diaphragm instead of perpendicular to such axis. The motion sensing means in the form of an unbonded electrical resistance strain wire is mounted between an end portion of the flexible beam beyond the flexure member, and the frame. This is accomplished by connecting the strain wire to a wire support mounted on said end portion of the flexible beam, and to a wire support mounted on the frame, said wire supports or pins being positioned with respect to each other so that the strain wire extends in a plane substantially normal to the plane of the flexible beam or diaphragm, or in other words parallel to the axis thereof.

Hence it is seen that the pin on the flexible beam or diaphragm is movable in response to displacement of, and directly with, the beam or diaphragm, and the other pin mounted on the frame is fixed. Thus, only the pin mounted on the beam or diaphragm is displaced, substantially reducing the tendency toward snapping of the pins mounted on such diaphragm, and particularly of the pins mounted on the frame. Shorter pins can also be employed to minimize pin breakage. Further, as result of decrease of relative arcuate movement of the pins on the flexible beam and on the frame, greater linearity of response is achieved. In addition, since one of the pins mounting the strain wire is connected to the frame, the length of the strain wire can be varied by placing the fixed pin at a shorter or greater distance from the movable pin, the length of the strain wire in the device of my patent being limited by the dimensions of the beam or diaphragm on which all of the pins of such device are mounted.

A force, e.g., a pressure, applied to said beam or diaphragm, either on the same or the other side of the flexure member or flexible support from its connection to said beam, i.e., applied to the outer end of said beam or adjacent the center of the beam, produces a flexure of said beam and said flexible support, in turn causing movement of the end of said beam beyond said flexible support in a direction opposite to the direction of movement of the central portion of said beam. The result is a pivotal motion of said pin mounted on the end of the beam corresponding to the displacement of the beam, to produce a response corresponding to the motion of the beam and the magnitude of the force applied thereto.

The flexure or flexible support for said beam or diaphragm may be two separate flexures unconnected except at the flexible beam and at the frame, or the flexure may be a single member, as in the case of a circular flexure described more fully hereinafter.

The flexible beam may be in a variety of shapes, which are intended to include not only a relatively narrow elongated member, but may be in the nature of a diaphragm of circular or elliptical shape, or of a shape having rounded corners and straight sides, or of any other suitable shape. The flexure or flexible support is connected to the flexible beam at two positions intermediate its ends, and if the support is in the nature of a pair of straight flexible walls parallel to each other, the connection between said flexible walls and the beam or diaphragm will be along two parallel lines in the plane of the beam so that flexure of the beam permitted by said flexible walls will be substantially in a longitudinal direction along the beam. On the other hand, if said flexible support or supports are arcuately shaped so that the connections between said supports and the beam or diaphragm are along arcs in the plane of said beam, said beam or diaphragm will deflect radially of said arcuate lines of connection on the application of a force against said diaphragm, and form a spherically shaped cap. In any event, the portions of said beam or diaphragm adjacent the periphery thereof and beyond the connections of said flexible supports with said beam will deflect from said connections in a direction opposite to deflection of the central portion of the diaphragm to form said cap.

The flexible beam is preferably in the form of a diaphragm mounted near but spaced from its periphery on a flexible cylindrical support in a frame. In preferred practice a pin is mounted adjacent the periphery of the diaphragm beyond the cylindrical support, the pin extending outwardly substantially parallel to the diaphragm. Preferably, a pair of pins are mounted in diametrically opposed positions on the outer periphery of the diaphragm, with a pair of fixed pins mounted on the frame opposite the pins on the diaphragm, with a strain wire mounted on one pair of movable and fixed pins on one side of the diaphragm and a strain wire mounted between the other pair of movable and fixed pins on the other side of the diaphragm, the strain wires being parallel to the axis of the diaphragm, as previously noted. The strain wires are connected in the well known Wheatstone bridge circuit, forming the active arm thereof, for measurement of the response due to displacement of the diaphragm.

In addition to the above advantages, stops to prevent a dangerous magnitude of strain on the wires, in excess of the safe maximum strain, can be installed readily to limit overextension of the strain wires under severe shock.

The transducer of the invention will be more clearly understood by reference to the description below of a preferred embodiment, taken in connection with the accompanying drawing, wherein.

Figure 1:
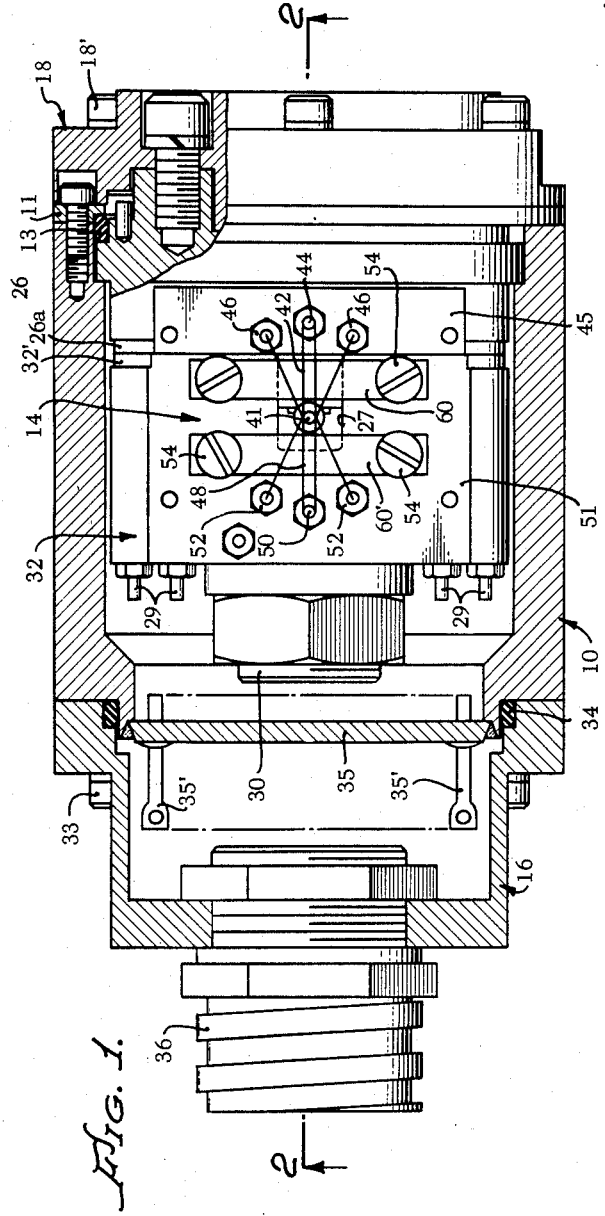
Fig. 1 is a side view of my device, shown partly in section.

Referring to Fig. 1 of the drawing, numeral 10 designates an instrument case, and 14 is an electrical strain wire pressure transducer according to the invention, mounted in the case. The case 10 is of generally cylindrical form and having a cylindrical cap 16 at one end and a pressure head 18 at the other end of the instrument. The transducer 14 has a pressure inlet connection 20 (see Fig. 2), a communicating channel 22, and a flexible beam or diaphragm 24 mounted on a substantially cylindrical support member or frame member 26. The support 26 is in the form of a circumambient wall and is connected to the diaphragm through a thin circumambient flexure member 26'. The diaphragm 24 has a peripheral portion 27 extending beyond the flexure member 26'. The pressure head 18 is connected to the base of the cylindrical support 26 by screws 18'. A ring 11, an O-ring seal 13 and a gasket 15 are clamped between members 18 and 26. Member 18 carries a plug 17 which is received within a cylindrical bore 17' of the support member 26, said plug being spaced at its outer end a short distance from diaphragm 24, forming a channel 21 adjacent members 17 and 24. An annular channel 23 is also provided between plug 17 and member 26. Ports 19 provided in plug 17 connect channel 22 with the annular channel 23. Thus, pressure fluid in channel 22 communicates with the diaphragm 24 via passages 19, 23 and 21, said passages forming a chamber within frame member 26.

Figure 5:
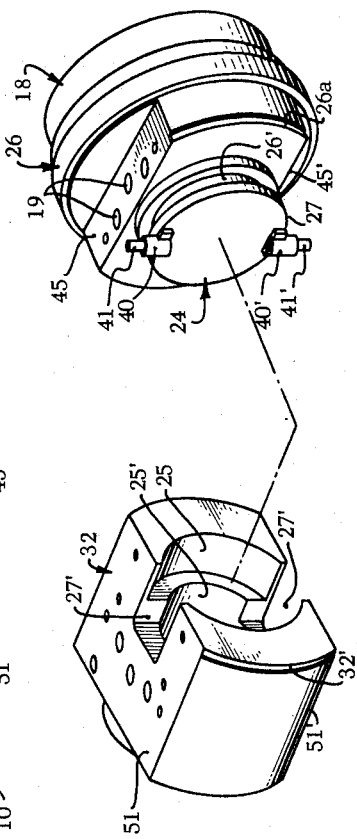
Fig. 5 represents perspective views of certain portions of my device.

A yoke or support member 32 (see Figs. 2 and 5) is positioned in axial alignment with member 26, said yoke having an arcuate bore 25, and a circular counterbore 25' passing through the yoke and communicating with the bore 25. Rectangular slots 27' are formed in the upper and lower faces of yoke 32. The yoke 32 is soldered or brazed along its peripheral edge 32' to the peripheral edge 26a of the member 26. The diaphragm 24 is thus received in the bore 25 of yoke 27. A screw stop 30 is threadably mounted in counterbore 25' of yoke 32 and extends through bore 25 to a position adjacent the diaphragm to prevent excessive displacement of the diaphragm to the left, as viewed in Fig. 2. One end of the yoke 32 carries four terminals 29 (see Fig. 1).

The cap 16 is connected to case 10 by screws 33, an O-ring 34 being clamped between members 10 and 16. A terminal plate 35 carrying terminals 35' is clamped adjacent the end of case 10, between the case and the cap 16, and an electrical connector 36 is mounted on cap 16 opposite plate 35.

Connected as by brazing to diametrically opposite peripheral portions 27 of diaphragm 24 on one side of said diaphragm are a pair of hubs 40 and 40' in which are mounted a pair of insulated pins 41 and 41' extending radially outwardly from the diaphragm and in diametric alignment with each other. The pins 41 and 41' extend through the upper and lower slots 27' of the yoke 32. A strain wire 42 (see Figs. 1 and 2) is looped in tension between and mounted upon pin 41 and a pin 44 mounted on a flattened upper portion 45 of member 26. The pins 41 and 44 are positioned on a line parallel to the axis of diaphragm 24. The ends of wire 42 are connected to terminals 46 on surface 45. A second strain wire 48 is looped in tension between and mounted on pin 41 and on a pin 50 positioned on the flat upper surface portion 51 of member 32, pin 50 being in alignment with pins 41 and 44. The ends of strain 48 are connected to terminals 52 on the flat surface 51.

In a similar manner a strain wire 42' (see Fig. 2) is looped in tension on pin 41' and on a pin 44' on the lower flat surface portion 45' of member 26, the ends of the strain wire being connected to terminals 46' on surface 45'. A second strain wire 48' is stretched in tension and mounted on pin 41' and a pin 50' located on the flat under surface 51' of member 32. The ends of strain wire 48' are connected to terminals 52' on surface 51'.

Pins 41', 44' and 50' are on a line parallel to the axis of diaphragm 24, and hence strain wires 42' and 48' are parallel to strain wires 42 and 48. Since pins 44 and 44' are diametrically aligned, and pins 50 and 50' are also in diametric alignment, strain wires 42 and 42' are coextensive and 48 and 48' are coextensive. The strain wires are connected in a bridge circuit in a well understood manner, employing terminals 29 for this purpose, leads (not shown) being connected from terminals 29 to terminals 35' and then through the connector 36, to an external source of potential and to a measuring instrument (both not shown).

Mounted by means of screw 54 on the upper flat surface 51 of yoke 32 across the upper slot 27' are a pair of parallel spaced bars 60 and 60' (see Figs. 1 to 4), and mounted in a similar manner on the flat lower surface 51' of member 32 are a pair of parallel bars 62 and 62'. Viewing Fig. 2, bars 60 and 62 are in vertical alignment and bars 60' and 62' are in vertical alignment. The upper bars 60 and 60' are positioned closely adjacent but spaced from pin 41. Similarly, lower bars 62 and 62' are spaced closely adjacent but spaced from the pin 41'. The space provided between pins 41 and 41' and the adjacent bars on both sides of each of these pins is such that if the strain wires are stretched to their safe maximum strain, as result of displacement of diaphragm 24, the bars act as stops to contact the pins 41 and 41' to prevent overloading of the strain wires.

A shield 65 is positioned around the strain wires 42 and 48, and is connected to the flat surface 51 of yoke 32, and to the flat surface 45 of member 26, by screws 66 (see Figs. 3 and 4) and a second shield 65' is positioned around the strain wires 42' and 48', said shield also being connected in a similar manner to the lower flat surface 51' of yoke 32 and to the lower flat surface 45' of member 26. These shields function to reduce the effect of temperature variations on the resistance of the strain wires.

Figure 2:
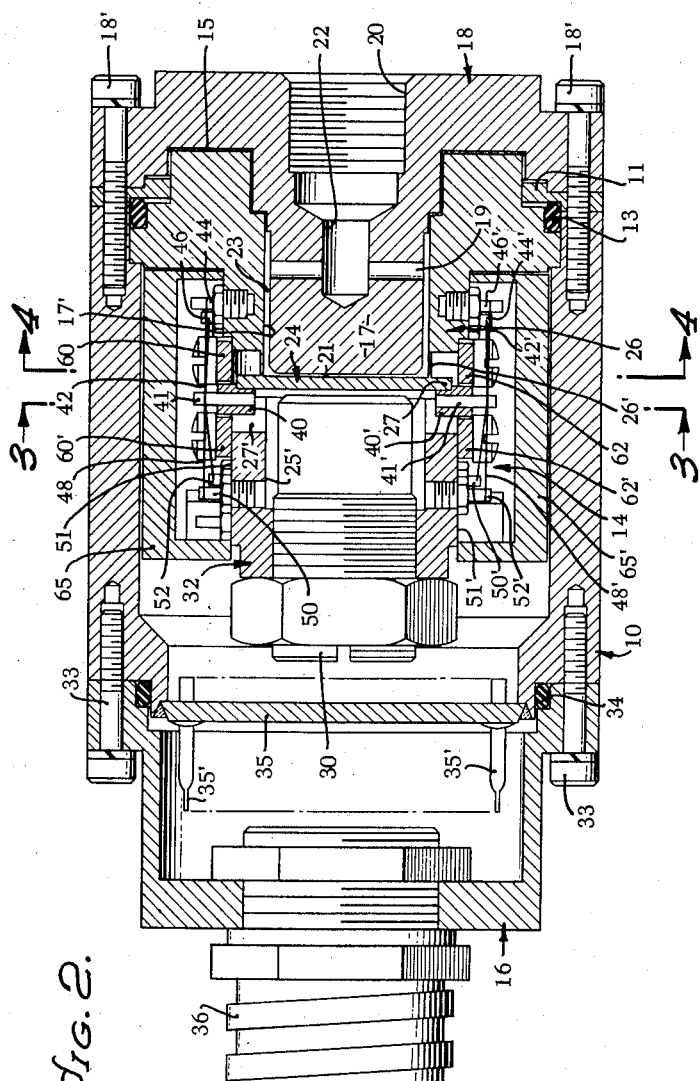
Fig. 2 is a section taken on line 2—2 of Fig. 1.
Figure 3:
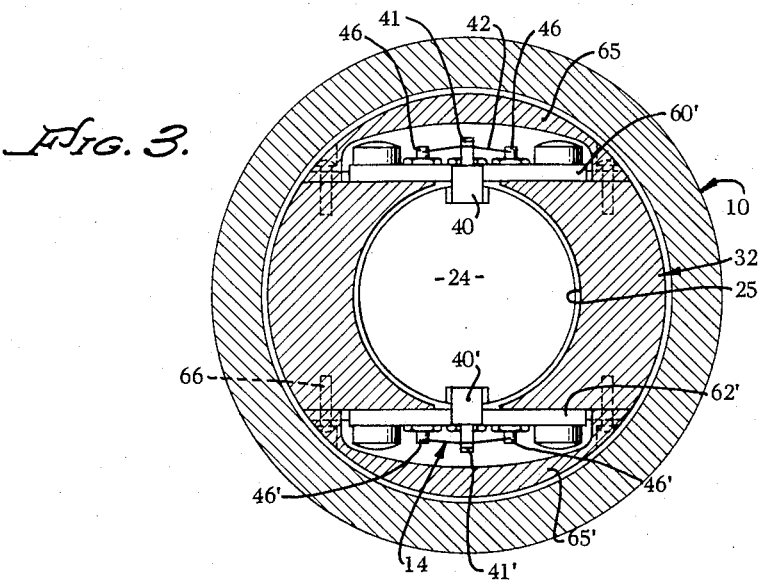
Fig. 3 is a section taken on line 3—3 of Fig. 2.
Figure 4:
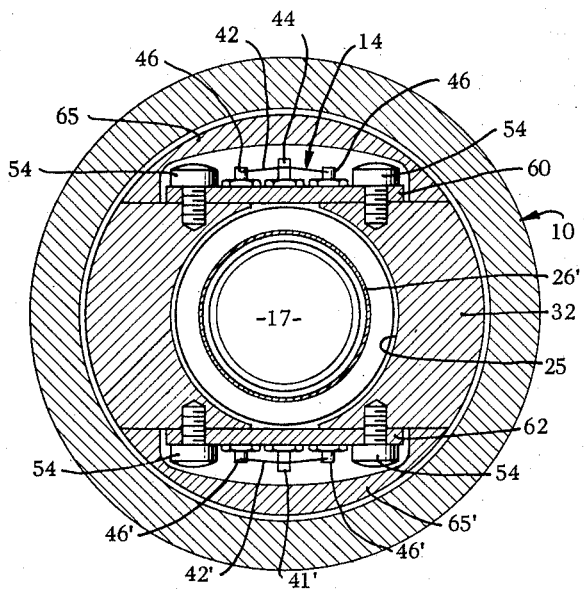
Fig. 4 is a section taken on line 4—4 of Fig. 2.

When positive pressure is applied through channels 22, 23 and 21 to the diaphragm 24, the center portion 24' of diaphragm 24 deflects to the left, viewing Fig. 2, and the outer peripheral portion 27 of the diaphragm deflects in the opposite direction, causing the pins 41 and 41' to move toward pins 44 and 44'. This causes the strain wires 42 and 42' to decrease in tension while increasing the tension on wires 48 and 48'. This change in strain of the wires is measured in the bridge, corresponding to the applied force or pressure. Where a negative pressure is applied, the center portion of diaphragm 24 will deflect to the right as viewed in Fig. 2, causing the peripheral portion 27 to deflect to the left, together with pins 41 and 41', which thus move toward pins 50 and 50'. This produces an increase in strain in the strain wires 42 and 42' and a decrease in strain in the wires 48 and 48'.

It is seen that the only movable pins are 41 and 41', which are connected to the diaphragm, since pins 44, 44', 50 and 50' are fixed. Pins 41 and 41' move linearly along the line between pins 42 and 50, and between pins 42' and 50', respectively. As result of this arrangement of the pins which mount the strain wires, as compared to the arrangement of the pins in the transducer of my above copending application and patent, the danger of pin breakage in the device of this invention is greatly reduced. Also, with the arrangement of the pins of the instant invention, shorter pins can be employed, further minimizing the danger of pin breakage.

Instead of using four strain wires, it will be understood by those skilled in the art that only two strain wires such as 48 and 48', or 42 and 42', can be employed.

Also, if desired, the pressure head can be replaced by a rod which can be connected to the central portion of the diaphragm to measure displacement of such rod, or a mass can be connected to the central portion of the diaphragm, to thus transform the device into a linear accelerometer. In addition, pressure or force can be applied to both sides of the diaphragm to transform the device into a differential pressure or force measuring transducer.

While I have described particular embodiments of my invention for the purpose of illustration, it should be understood that various modifications and adaptations thereof may be made within the spirit of the invention as set forth in the appended claims.

I claim:

1. A motion sensing device which comprises a frame, a flexible beam, a flexure member connected to said frame and to said beam at spaced points intermediate the ends of said beam and at an angle thereto to provide bending in said flexure member and said beam between said spaced points, each end of said beam extending beyond said flexure member and beyond each of said spaced points, said beam deflecting upon said flexure member between said spaced points of connection of said beam to said flexure member in a direction opposite to the direction of deflection of said beam at points beyond said flexure member, and an unbonded electrical resistance strain wire mechanically connected to said frame and to an end of said beam beyond said flexure member and said spaced points.

2. A motion sensing device which comprises a frame, a flexible beam, a flexure member connected to said frame and to said beam at spaced points intermediate the ends of said beam and at an angle thereto to provide bending in said flexure member and said frame between said spaced points, each end of said beam extending beyond said flexure member and beyond each of said spaced points, said beam deflecting upon said flexure member between said spaced points of connection of said beam to said flexure member in a direction opposite to the direction of deflection of said beam at points beyond said flexure member, an unbonded electrical resistance strain wire mechanically connected to said frame and to an end of said beam beyond said flexure member and said spaced points, said strain wire extending substantially parallel to the axis of said diaphragm, and an electrical connection at the ends of said strain wire.

3. A motion sensing device which comprises a frame, a diaphragm, a flexure member connected to said frame and to said diaphragm at spaced points intermediate opposite adjacent peripheral portions of said diaphragms and at an angle thereto to provide bending in said flexure member and said diaphragm between said spaced points, said adjacent peripheral portions of said diaphragm extending beyond said flexure member and beyond each of said spaced points, said diaphragm deflecting upon said flexure member between said spaced points of connection of said diaphragm to said flexure member in a direction opposite to the direction of deflection of said peripheral portions of said diaphragm at points beyond said flexure member, an unbonded electrical resistance strain wire mechanically connected to said frame and to a peripheral portion of said diaphragm beyond said flexure member and said spaced points, said strain wire extending substantially parallel to the axis of said diaphragm, and an electrical connection at the ends of said strain wire.

4. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, a first wire support mounted adjacent the periphery of said diaphragm beyond said flexure member, a second wire support mounted on said frame and spaced from said first wire support, an unbonded electrical resistance strain wire mounted on said supports, said strain wire extending substantially parallel to the axis of said diaphragm, and an electrical connection at the ends of said strain wire.

5. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, a first pin mounted adjacent the periphery of said diaphragm beyond said flexure member, a second pin mounted on said frame and spaced from said first pin, said pins being positioned on a line substantially parallel to the axis of said diaphragm, an unbonded electrical resistance strain wire mounted on said pins, said strain wire extending substantially parallel to the axis of said diaphragm, and an electrical connection at the ends of said strain wire.

6. A motion sensing device which comprises a frame, a diaphragm supported on said frame, a circumambient wall connected to said diaphragm, said diaphragm extending beyond said wall, said wall being flexible along a circumambient area of flexure on application of a force against said diaphragm, said diaphragm within said wall deflecting in a direction opposite to the direction of deflection of the outer end of said diaphragm beyond said wall, an insulated pin mounted adjacent the periphery of said diaphragm beyond said circumambient wall, an insulated pin mounted on said frame and spaced from said first mentioned pin, an unbonded electrical resistance strain wire looped in tension between and mounted on said pins, said strain wire extending substantially parallel to the axis of said diaphragm, and an electrical connection at the ends of said strain wire.

7. A pressure responsive device which comprises a frame, a chamber in said frame, an inlet to said chamber, a diaphragm supported on said frame at one end of said chamber spaced from said inlet, a circumambient wall of said frame being connected to said diaphragm, said diaphragm extending beyond said wall, said wall being flexible along a circumambient area of flexure on variation in pressure in said chamber against said diaphragm, said diaphragm within said wall deflecting in a direction opposite to the direction of deflection of the outer end of said diaphragm beyond said wall, an insulated pin mounted adjacent the periphery of said diaphragm beyond said circumambient wall, an insulated pin mounted on said frame and spaced from said first mentioned pin, an unbonded electrical resistance strain wire looped in tension between and mounted on said pins, said strain wire extending substantially parallel to the axis of said diaphragm, and an electrical connection at the ends of said strain wire.

8. A motion sensing device which comprises a diaphragm, a frame, a circumambient flexure member mounted in said frame, said member being connected to said diaphragm and intersecting said diaphragm, said diaphragm extending beyond said circumambient flexure member, said diaphragm bending along lines of flexure on both sides of said flexure member upon application of a force against said diaphragm, means for applying a force to said diaphragm, the deflection of said diaphragm on one side of said flexure member being in a direction opposite to the deflection of the diaphragm on the other side of said flexure member, an insulated pin mounted adjacent the periphery of said diaphragm beyond said circumambient wall, an insulated pin mounted on said frame and spaced from said first mentioned pin, said pins being substantially parallel to the axis of said diaphragm, an unbonded electrical resistance strain wire looped in tension between and mounted on said pins, said strain wire extending substantially parallel to the axis of said diaphragm, and an electrical connection at the ends of said strain wire.

9. A motion sensing device which comprises a diaphragm, a frame, a circumambient flexure member mounted in said frame, said member being connected to said diaphragm and intersecting said diaphragm, said diaphragm extending beyond said circumambient flexure member, said diaphragm bending along lines of flexure on both sides of said flexure member upon application of a force against said diaphragm, means for applying a force to said diaphragm, the deflection of said diaphragm on one side of said flexure member being in a direction opposite to the deflection of the diaphragm on the other side of said flexure member, a first insulated pin mounted adjacent the periphery of said diaphragm beyond said circumambient wall and extending radially outward from said diaphragm, a second insulated pin mounted on said frame and spaced from said first pin, said pins being substantially parallel to the axis of said diaphragm, a first unbonded electrical resistance strain wire looped in tension between and mounted on said first and second pins, said first strain wire extending parallel to the axis of said diaphragm, a third insulated pin mounted adjacent the periphery of said diaphragm diametrically opposite said first pin and said third pin extending radially outward from said diaphragm, a fourth insulated pin mounted on said frame and spaced from said third pin, said third and fourth pins being substantially parallel to the axis of said diaphragm, a second unbonded electrical resistance strain wire looped in tension between and mounted on said third and fourth pins, said second strain wire extending parallel to the axis of said diaphragm, and an electrical connection at the ends of said strain wires.

10. A transducer which comprises a diaphragm, a frame, means mounted in said frame for flexibly supporting said diaphragm, said means including at least one member having an arcuately shaped cross section connected at an angle to said diaphragm at opposite spaced positions intermediate the ends of said diaphragm and intersecting said diaphragm along an arc, said diaphragm extending beyond said flexible supporting means on each side of said spaced positions and bending along lines of flexure radially of said arc on application of a force against said diaphragm, means for applying a force to said diaphragm between said flexible support means, said diaphragm deflecting upon said arcuately shaped member at points between said flexible support means in a direction opposite to the direction of deflection of said diaphragm at the outer ends thereof beyond said flexible support means, a pin mounted adjacent the periphery of said diaphragm beyond said flexible supporting means, a pin mounted on said frame and spaced from said first pin, said pins being positioned substantially parallel to the axis of said diaphragm, an unbonded electrical resistance strain wire mounted on said pins, said strain wire extending substantially parallel to the axis of said diaphragm, and an electrical connection at the ends of said strain wire.

References Cited in the file of this patent

UNITED STATES PATENTS 2,840,675     Di Giovanni _____ June 24, 1958